(12) United States Patent
Tsai

(10) Patent No.: US 6,760,217 B2
(45) Date of Patent: Jul. 6, 2004

(54) PORT REPLICATOR

(75) Inventor: Dui-Ming Tsai, Taipei (TW)

(73) Assignee: Quanta Computer Inc., Taoyuan (TW)

( * ) Notice: Subject to any disclaimer, the term of this patent is extended or adjusted under 35 U.S.C. 154(b) by 109 days.

(21) Appl. No.: 10/264,699

(22) Filed: Oct. 4, 2002

(65) Prior Publication Data

US 2003/0198011 A1 Oct. 23, 2003

(30) Foreign Application Priority Data

Apr. 17, 2002 (TW) ........................................ 91205126 U

(51) Int. Cl.[7] ................................................ H05K 5/02
(52) U.S. Cl. ........................ 361/683; 361/686; 710/303
(58) Field of Search ................................. 361/683, 684, 361/685, 686, 680; 312/223.1, 223.2; 320/107, 113; 710/300, 303, 304

(56) References Cited

U.S. PATENT DOCUMENTS 5,460,547 A * 10/1995 Belt et al. .................... 439/638
5,568,359 A * 10/1996 Cavello et al. ............... 361/686
5,687,387 A * 11/1997 Endejan et al. ................. 710/2
6,046,571 A * 4/2000 Bovio et al. .................. 320/113
6,424,524 B2 * 7/2002 Bovio et al. .................. 361/686
6,501,646 B2 * 12/2002 Suzuki ........................ 361/686

* cited by examiner

Primary Examiner—Dean A. Reichard
Assistant Examiner—Carmelo Oliva

(57) ABSTRACT

A port replicator. The port replicator includes a housing, a transmission assembly, and a lift assembly. The transmission assembly, disposed in the housing, includes an engaging portion and a push unit. The push unit is moveably disposed on the housing. The engaging portion protrudes from the housing when the push unit is located at a first position. The engaging portion moves toward the housing when the push unit moves to a second position. The lift assembly, including a separation unit, is disposed in the housing in a manner such that it moves along with the transmission assembly. The separation unit is moveably disposed on the housing. The push unit moves to the second position to move the separation unit to a fourth position when the push unit is located in the first position and the separation unit is located at a third position.

20 Claims, 7 Drawing Sheets

PORT REPLICATOR

BACKGROUND OF THE INVENTION

1. Field of the Invention

The invention relates to a port replicator, in particular, a port replicator that can be conveniently separated from a portable computer.

2. Description of the Related Art

Portable computer docking units have been marketed as devices that allow the user to have the advantages of a portable computer without any of the limitations when operating at the user's desk or other primary work location.

In the typical implementation, the docking unit is located at the user's office. The docking unit has a docking bay for receiving and providing electrical connections to the portable computer. The docking unit may also have a bus extension that electrically mates with the portable computer's bus when it is in the docking bay and a number of expansion slots to hold hard drives, CD-ROMs, modems etc., not found in the portable computer. As a result, when the portable computer is installed in the docking unit, its minimalist portable computer capabilities are augmented and extended to those typically found in most desktop or non-portable computer systems. In this way, the user has the advantages associated with the portable computer while not losing the functionality that would otherwise be available from a desktop computer system.

Most docking units also have port replication capability. Many times the portable computer will be outfitted with a variety of communication ports, including serial ports, parallel ports, universal serial bus ports (USB), video ports, RJ45 network ports, etc. These ports are accessed through port connectors, usually on the back of the computer. It is typical for the docking unit to have a similar array of port connectors so that when the portable computer is connected to the docking unit, the portable computer's communication ports are tied to the analogous port connectors in the docking unit. In the parlance of the industry, the portable computer's communication ports are replicated in the docking unit. The advantage of this system is that the user can connect such components as a network interface, full size keyboard, mouse, and full size monitor to the port connectors of the docking unit. The docked portable computer thus connects to these various devices, and the mere act of undocking the portable computer serves to disconnect the computer from these various devices, in one step.

Some docking units are intended primarily as port replicators. These devices will not have the bus extensions, and consequently, the expansion slots, to support additional active bus devices for the portable computer. Instead, they are primarily intended to perform the port replication function. While obviously not having all of the advantages associated with the more elaborate docking units, port replicators provide the user with many of the core advantages of a desktop docking unit, such as the possibility of using a full size keyboard and desktop monitor and offering these features at a reasonable price point in a system with a small footprint.

FIG. 1 shows a conventional port replicator 20. The port replicator 20 includes four hooks 22 on a surface facing a portable computer 10. The hooks 22 can engage with slots 12 formed on a bottom surface of the portable computer 10. The port replicator 20 further comprises a connector 21 that can be electrically coupled to a connector 11 of the portable computer 10. Thus, the port replicator 20 can offer additional functions to the portable computer 10.

It is noted that when the port replicator is separated from the portable computer, the user must move the portable computer backward and forward to separate them. However, since the portable computer is provided with a certain weight, it is difficult for the user to move the portable computer to separate them.

In view of the above situation, there is another port replicator with an actuating device for separation. For example, the user can push a button to actuate a separation device in the port replicator. By means of the separation device, the port replicator can be separated from the portable computer.

However, the port replicator with the separation device still has the following problems:

1. Since the portable computer is provided with a certain weight, the user must push the button very hard to separate the port replicator and the portable computer;
2. After the separation device ejects the portable computer from the port replicator, the portable computer can easily fall back to the port replicator due to gravity. Thus, the connector of the portable computer and the connector of the port replicator are engaged again. Accordingly, there is an additional mechanism to prevent the connector of the portable computer from re-engaging with the connector. However, such mechanism may not properly support the portable computer due to access weight of the portable computer; and
3. After the portable computer is combined with the port replicator, the port replicator may not be solidly connected to the portable computer due to vibration.

SUMMARY OF THE INVENTION

In order to address the disadvantages of the aforementioned port replicator, the invention provides a port replicator that can be conveniently separated from a portable computer.

Accordingly, the invention provides a port replicator. The port replicator comprises a housing, a transmission assembly, and a lift assembly. The transmission assembly, disposed in the housing, includes an engaging portion and a push unit. The push unit is disposed in the housing in a manner such that the push unit moves between a first position and a second position. The engaging portion protrudes from the housing and is compressible when the push unit is located in the first position. The engaging portion moves toward the housing when the push unit moves to the second position from the first position. The lift assembly, including a separation unit, is disposed in the housing in a manner such that the lift assembly moves along with the transmission assembly. The separation unit is disposed in the housing in a manner such that the separation unit moves between a third position and a fourth position. The push unit moves to the second position to move the separation unit to the fourth position from the third position when the push unit is located in the first position and the separation unit is located in the third position. Thus, when the push unit moves to second position from the first position, the engaging portion moves into the housing before the separation unit moves.

In a preferred embodiment, the transmission assembly further comprises a fixed member and a first moving member. The fixed member is fixedly disposed on the housing.

The first moving member, including the engaging portion, is kept by the fixed member and disposed in the housing in a moveable manner. The first moving member abuts the push unit so that the first moving member moves along with the push unit.

Furthermore, the first moving member includes a first rotating member, and the push unit includes a post abutting the first rotating member, and the push unit moves the first moving member by the post abutting the first rotating member. It is understood that the first rotating member is a roller. The housing includes a first through hole, and the fixed member includes a locating member that passes through the first through hole. The transmission assembly further comprises a first spring connecting the fixed member and the first moving member so that the first moving member moves in a predetermined range.

Moreover, the post includes an inclined surface abutting the first rotating member.

In another preferred embodiment, the lift assembly further comprises a link and a transfer unit. The link abuts the push unit at one end to rotate along with the movement of the push unit. The transfer unit abuts the other end of the link to move along with the rotation of the link and abuts the separation unit to move the separation unit.

Furthermore, the transfer unit comprises a second moving member and a second spring. The second moving member abuts the link and the separation unit respectively. The second spring, disposed on the housing, restrains the second moving member.

In another preferred embodiment, the push unit comprises a first button and a third spring. The first button is disposed in the housing in a manner such that the first button moves between the first position and the second position. The third spring, disposed on the first button, returns the first button to the first position from the second position.

Furthermore, the first button includes a second rotating member abutting the lift assembly. The second rotating member is a roller.

In another preferred embodiment, the separation unit comprises a support, a second button, and a fourth spring. The support is fixedly disposed in the housing. The second button is disposed in the support in a manner such that the second button moves between the third position and the fourth position. The fourth spring abuts the second button to return the second button to the fourth position from the third position.

Furthermore, the housing includes a second through hole for the second button to pass through.

In another preferred embodiment, the housing comprises a base and a cover. The base is used for the lift assembly to be disposed on. The cover, combined with the base, is used for the transmission assembly to be disposed on.

Furthermore, the housing includes a receiving portion for the push unit to be disposed on.

BRIEF DESCRIPTION OF THE DRAWINGS

The invention is hereinafter described in detail with reference to the accompanying drawings in which.

DETAILED DESCRIPTION OF THE INVENTION

Figure 1:
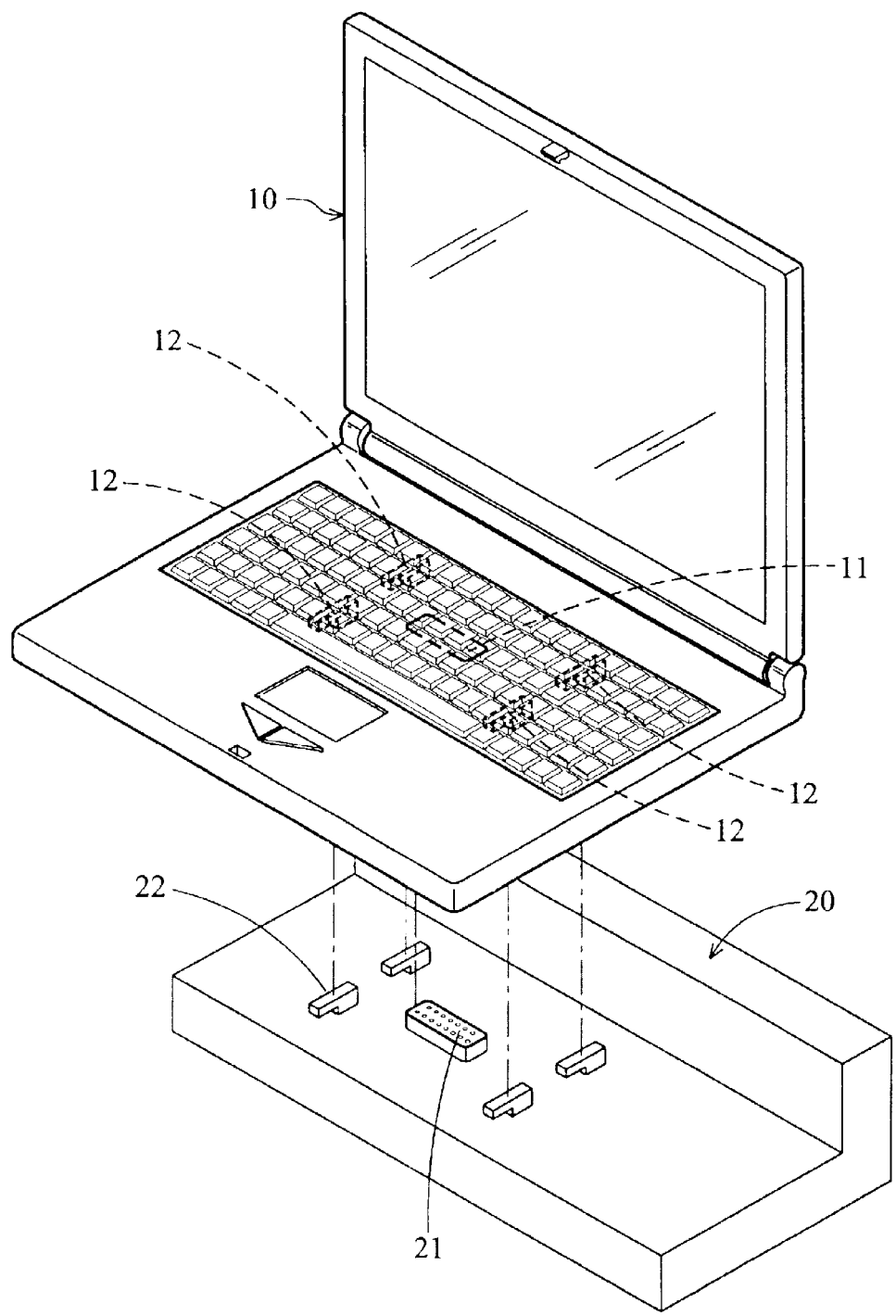
FIG. 1 is a schematic view of a conventional port replicator.
Figure 2:
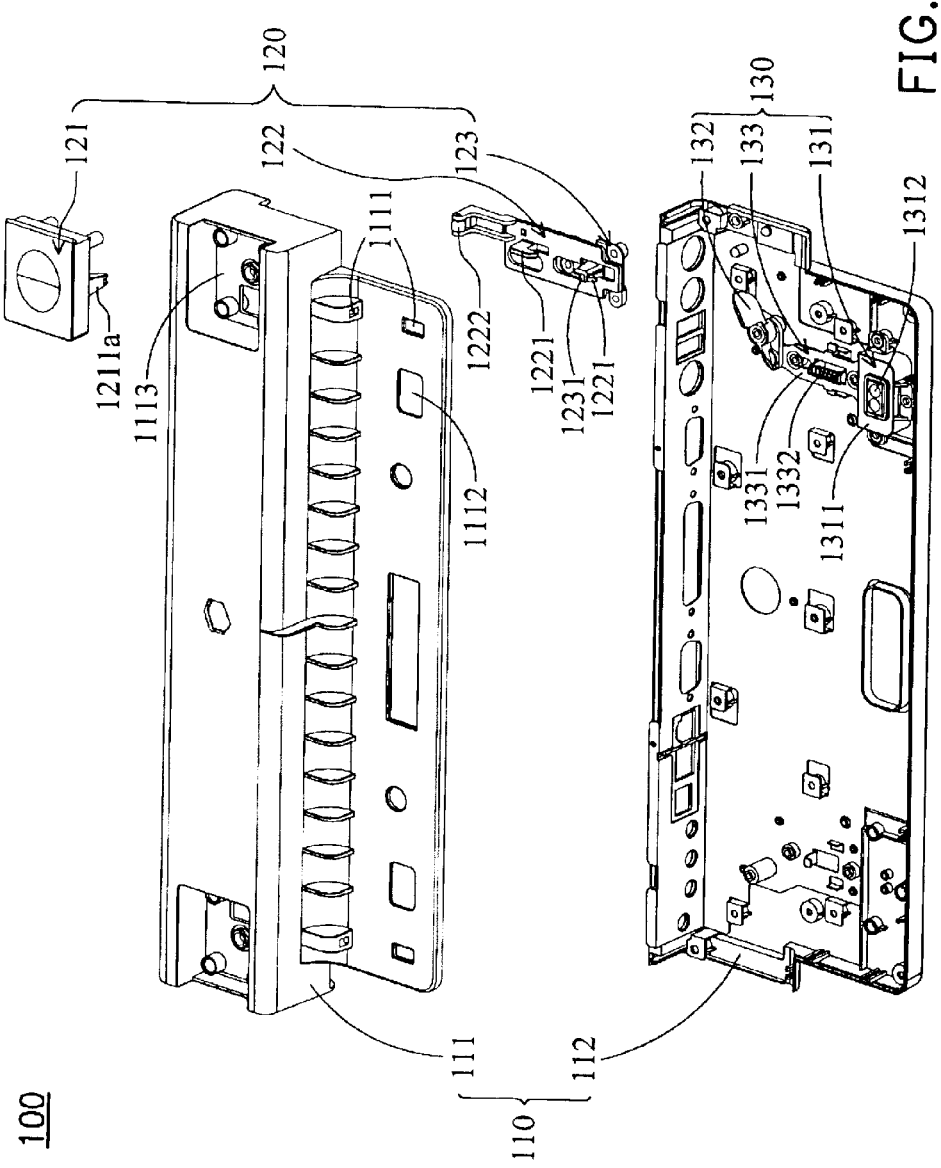
FIG. 2 is an exploded view showing a port replicator as disclosed in this invention.

Referring to FIG. 2, a port replicator 100 as disclosed in this invention comprises a housing 110, two transmission assemblies 120, and two lift assemblies 130. It is noted that only one of the transmission assemblies 120 and one of the lift assemblies 130 are illustrated in the drawings and are described in the following description since both of the transmission assemblies 120 have the same structure and both of the lift assemblies 130 have the same structure. Also, the transmission assemblies 120 and the lift assemblies 130 can be disposed at the left portion and the right portion of the housing 110 respectively. It is understood that there is no connecting assembly between the assemblies at the left portion and the right portion in the drawing; therefore, the assemblies at the left portion and those at the right portion are independent. However, in practice, an additional connecting assembly can be disposed so that the assemblies at one portion can be preceded along with those at the other portion. Thus, the user can actuate the assemblies in both portions by actuating only one portion. Furthermore, only one transmission assembly 120 and one lift assembly 130 can be disposed in the port replicator 100 when the transmission assembly 130 is disposed around the center portion of the housing 110.

The housing 110 is used as a body of the port replicator 100, and comprises a base 112 and a cover 111. The lift assembly 130 is disposed on the base 112. The cover 111 is combined with the base 112, and the transmission assembly 120 is disposed on the cover 111 as shown in FIG. 3b. Furthermore, the cover 111 includes a plurality of first through holes 1111, a plurality of second through holes 1112, and a plurality of receiving portions 1113.

Figure 3A:
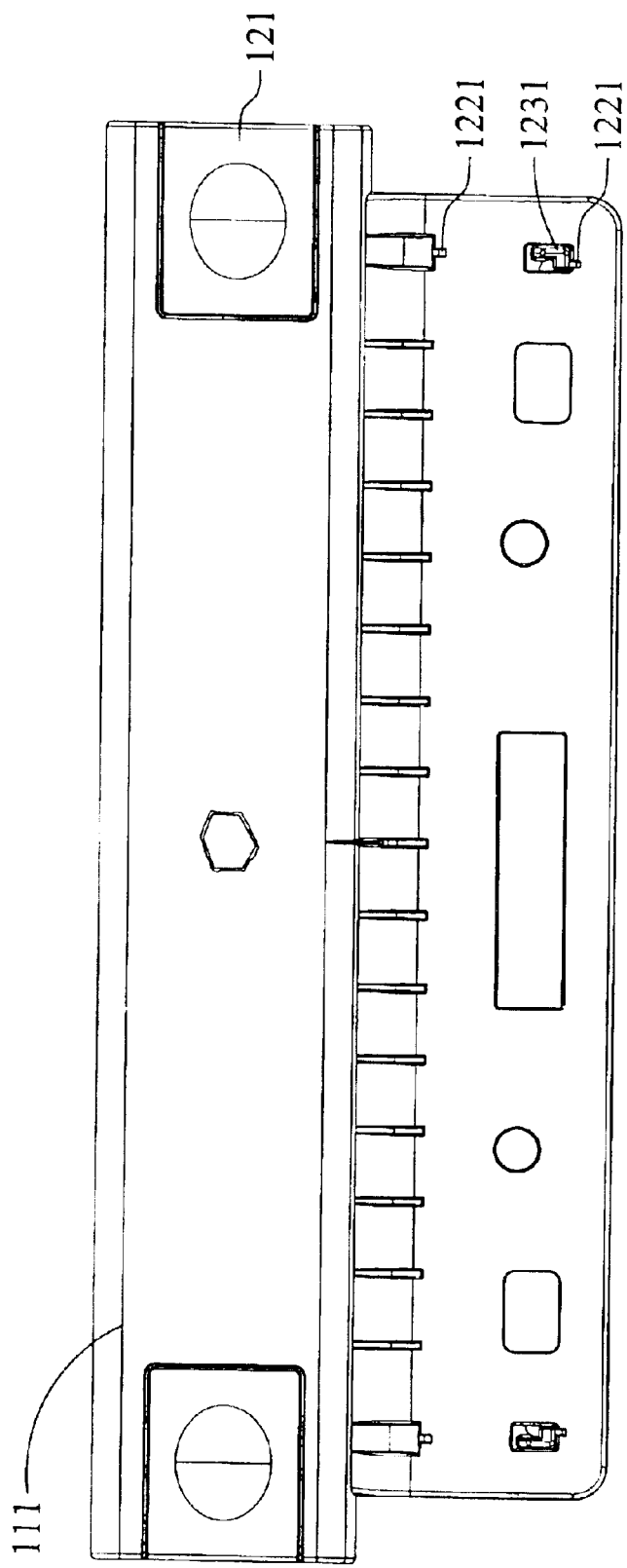
FIG. 3a is a top view showing a cover in FIG. 2 combined with a transmission assembly.
Figure 3B:
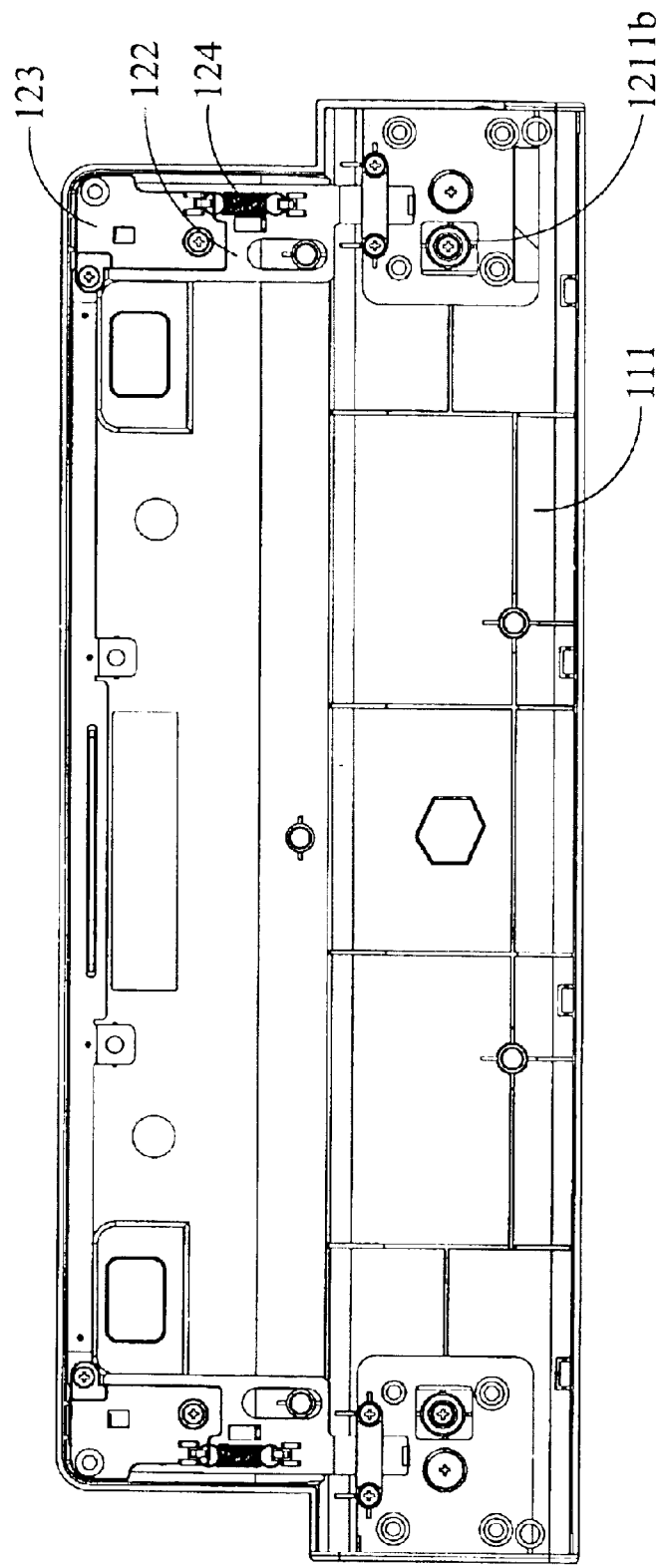
FIG. 3b is a bottom view showing a cover in FIG. 2 combined with a transmission assembly.

Referring to FIG. 2, FIG. 3a and FIG. 3b, the transmission assembly 120 is disposed in the cover 111 of the housing 110, and comprises a first moving member 122, a push unit 121, a fixed member 123, and a first spring 124.

The first moving member 122 abuts the push unit 121, and is provided with two engaging portions 1221 and a first rotating member 1222. The first rotating member 1222 is a roller.

Figure 4A:
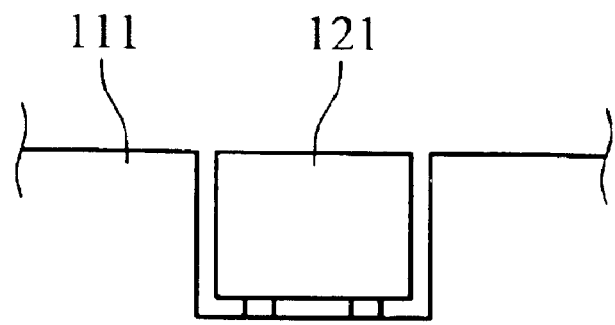
FIG. 4a is a side view showing a push unit in FIG. 2 located in a first position.
Figure 4B:
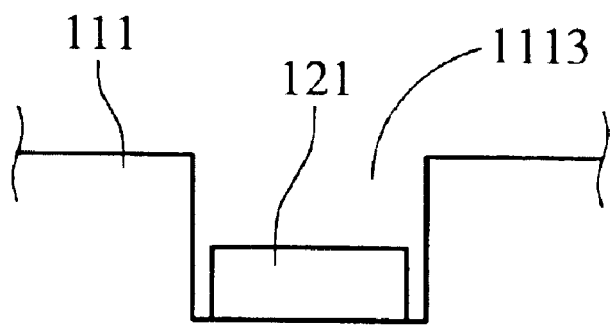
FIG. 4b is a side view showing a push unit in FIG. 2 located in a second position.
Figure 5A:
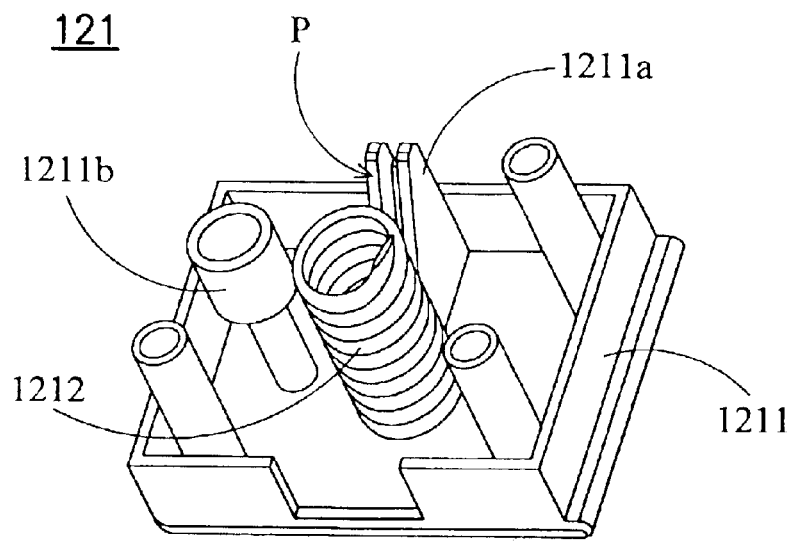
FIG. 5a is a bottom view showing a push unit in FIG. 2.

The push unit 121 is disposed on the receiving portion 1113 of the cover 111 of the housing 110 in a manner such that it moves between an original position (as shown in FIG. 4a and hereinafter referred to as a first position) and a pressed position (as shown in FIG. 4b and hereinafter referred to as a second position). As shown in FIG. 5a, the push unit 121 comprises a first button 1211 and a third spring 1212. The first button 1211 is used as a body of the push unit 121, and is disposed on the receiving portion 1113 of the cover 111 of the housing 110 in a manner such that it moves between the first position and the second position. The first button 1211 includes a post 1211a and a second rotating member 1211b. The second rotating member 1211b is a roller, and the post 1211a abuts the first rotating member 1222 of the first moving member 122. The post 1211a includes an inclined surface P abutting the first rotating member 1222. The third spring 1212, disposed on the first button 1211, returns the first button 1211 to the first position from the second position.

Referring to FIG. 2 and FIG. 3b, the fixed member 123 is fixedly disposed on the cover 111 of the housing 110, and holds the first moving member 122. The fixed member 123 includes a locating member 1231 passing through the first through hole 1111 of the cover 111, and locates a portable computer disposed thereon.

As shown in FIG. 3b, the first spring 124 connects the fixed member 123 and the first moving member 122 so that the first moving member 122 moves in a predetermined range.

The transmission assembly 120 is constructed as stated above. When the push unit 121 is located in the first position as shown in FIG. 4a, the engaging portion 1221 of the first moving member 122 protrudes from the cover 111 of the housing 110 and is compressible. When the push unit 121 moves to the second position as shown in FIG. 4b from the first position, the push unit 121 moves the first moving member 122 so that the engaging portion 1221 moves into the cover 111 of the housing 110.

Referring to FIG. 2, the lift assembly 130 is disposed in the base 112 of the housing 110 in a manner such that it moves along with the transmission assembly 120, and comprises a link 132, a transfer unit 133, and a separation unit 131. The link 132 is disposed on the base 112 of the housing 110 in a rotatable manner, and abuts the second rotating member 1211b of the first button 1211 of the push unit 121 at one end to rotate along with the movement of the push unit 121. The link 132 abuts the transfer unit 133 at the other end.

The transfer unit 133 comprises a second moving member 1331 and a second spring 1332. The second moving member 1331 abuts the link 132 and the separation unit 131 respectively. The second moving member 1331 is provided with a fork portion 1331a abutting the separation unit 131. The second spring 1332, disposed on the base 112 of the housing 110, restrains the second moving member 1331.

Figure 5B:
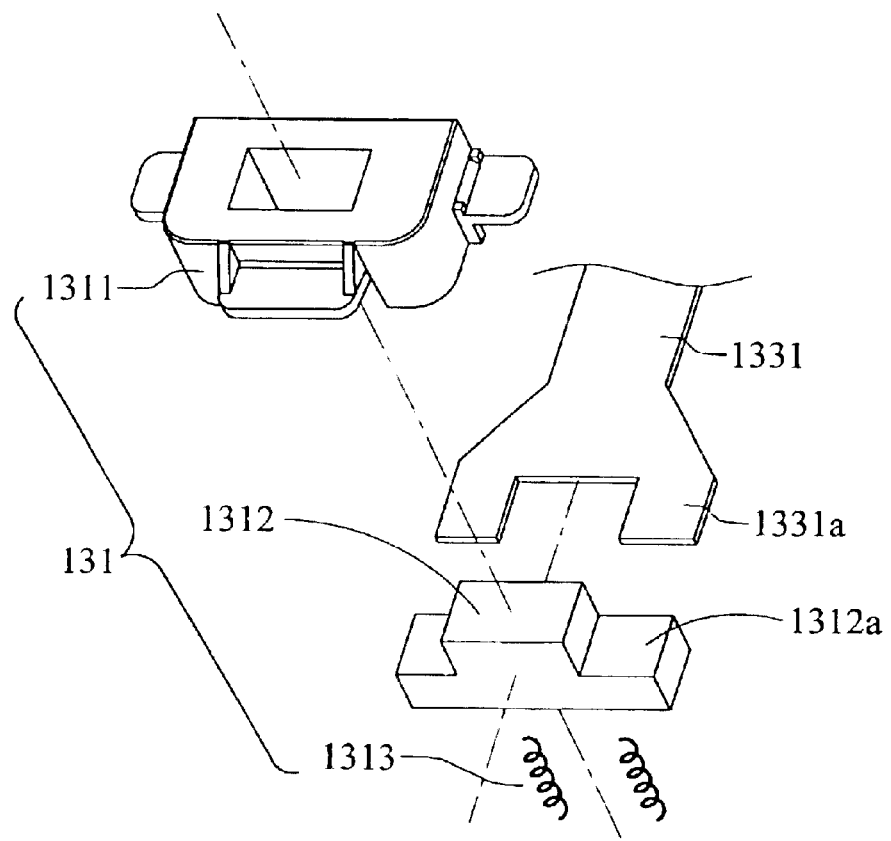
FIG. 5b is an exploded view showing a separation unit in FIG. 2.
Figure 6A:
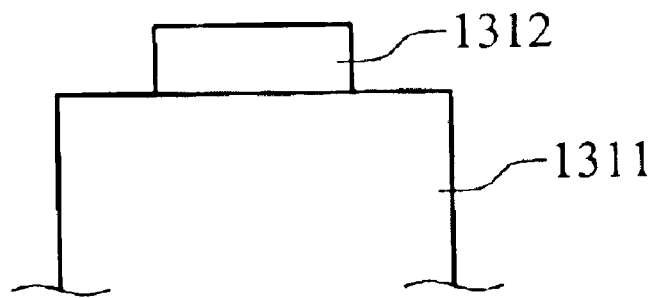
FIG. 6a is a side view showing a second button in FIG. 2 located in a third position.
Figure 6B:
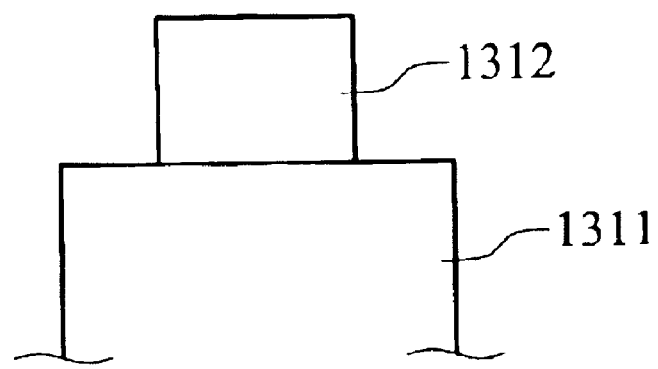
FIG. 6b is a side view showing a second button in FIG. 2 located in a fourth position.

As shown in FIG. 5b, the separation unit 131 comprises a support 1311, a second button 1312, and two fourth springs 1313. The support 1311 is fixedly disposed on the base 112 of the housing 110. The second button 1312 is disposed on the support 1311 in a manner such that it moves between a pressed position (as shown in FIG. 6a and hereinafter referred to as a third position) and a protruding position (as shown in FIG. 6b and hereinafter referred to as a fourth position). The second button 1312 is provided with a step portion 1312a. When the second button 1312 is located in the third position as shown in FIG. 6a, the step portion 1312a is held by the fork portion 1331a of the second moving member 1331 of the transfer unit 133 to be kept in the third position as shown in FIG. 6a. The fourth spring 1313 abuts the second button 1312 to return the second button 1312 to the fourth position as shown in FIG. 6b from the third position as shown in FIG. 6a.

Furthermore, referring to FIG. 2, the second button 1312 passes through the second through hole 1112 of the cover 111 of the housing 110.

The lift assembly 130 is constructed as stated above. When the push unit 121 is located in the first position as shown in FIG. 4a and the second button 1312 of the separation unit 131 is located in the third position as shown in FIG. 6a, the push unit 121 moves to the second position as shown in FIG. 4b to move the second button 1312 of the separation unit 131 to the fourth position as shown in FIG. 6b from the third position as shown in FIG. 6a via the first moving member 122, the link 132, and the transfer unit 133. Thus, when the push unit 121 moves to second position as shown in FIG. 4b from the first position as shown in FIG. 4a, the engaging portion 1221 of the first moving member 122 moves into the cover 111 of the housing 110 before the second button 1312 of the separation unit 131 moves.

It is noted that after the external force is removed, the third spring 1212 of the push unit 121 can bring the first button 1211 located in the second position back to the first position. In contrast, since the second button 1312 located in the third position is held by the second moving member 1331, the fourth spring 1313 of the separation unit 131 cannot bring the second button 1312 located in the third position back to the fourth position after the external force is removed. However, the push unit 121 can actuate the second button 1312 located in the third position back to the fourth position if needed.

In order to combine a portable computer and the port replicator 100, the portable computer is placed on the port replicator 100. At this time, the bottom of the portable computer presses the second button 1312 located in the fourth position so that the third spring 1332 moves the second moving member 1331. Then, the fork portion 1331a of the second moving member 1331 engages the step portion 1312a of the second button 1312 to move the second button 1312 to the third position. Also, the portable computer moves the engaging portion 1221 backwards. After the portable computer is held by the port replicator 100, the first spring 124 moves the engaging portion 1221 forward so that the engaging portion 1221 engages the portable computer.

In order to separate the portable computer from the port replicator 100, the push unit 121 located in the first position is pressed down. In the beginning, the push unit 121 drives the first rotating member 1222 of the first moving member 122 by the inclined surface P of the post 1211a to gradually move the engaging portion 1221 backward. After the push unit 121 is pressed down a predetermined distance, the second rotating member 1211b rotates the link 132 to pull the second moving member 1331 backward. Then, the engaging portion 1221 disengages from the portable computer and stops. At this time, the link 132 is still driven by the push unit 121 until the fork portion 1331a of the second moving member 1331 disengages from the second button 1312. Thus, by means of the fourth spring 1313, the second button 1312 returns to the fourth position from the third position to eject the portable computer.

As stated above, in the port replicator 100 as disclosed in this invention, the push unit 121 is pressed down in a plumb direction to move the engaging portion 1221 backward to disengage from the portable computer. Also, when the push unit 121 is pressed down, the second button 1312 is precisely controlled by the second spring 1332. Specifically, when the push unit 121 is pressed down, the engaging portion 1221 is firstly moved backward to disengage from the portable computer; then, the second button 1312 is moved upward to eject the portable computer. Thus, it is more convenient to separate the port replicator from the portable computer.

In addition, when the port replicator is separated from the portable computer, a large force is not required to press down the push unit.

Furthermore, since the second button ejects the portable computer after the engaging portion disengages from the portable computer, the portable computer will not re-engage due to gravity.

Moreover, after the portable computer engages with the port replicator, the engaging portion can properly engage with the portable computer. Thus, the portable computer will not separate from the port replicator due to vibration.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A port replicator comprising:
    a housing;
    a transmission assembly, disposed in the housing, including an engaging portion and a push unit, wherein the push unit is disposed on the housing in a manner such that the push unit moves between a first position and a second position, and the engaging portion protrudes from the housing and is compressible when the push unit is located in the first position, and the engaging portion moves toward the housing when the push unit moves to the second position from the first position; and
    a lift assembly, including a separation unit, disposed on the housing in a manner such that the lift assembly moves along with the transmission assembly, wherein the separation unit is disposed in the housing in a manner such that the separation unit moves between a third position and a fourth position, and the push unit moves to the second position to move the separation unit to the fourth position from the third position when the push unit is located in the first position and the separation unit is located in the third position, whereby when the push unit moves to second position from the first position, the engaging portion moves into the housing before the separation unit moves.

2. The port replicator as claimed in claim 1, wherein the transmission assembly further comprises:
    a fixed member fixedly disposed on the housing; and
    a first moving member, including the engaging portion, kept by the fixed member and disposed on the housing in a moveable manner, wherein the first moving member abuts the push unit so that the first moving member moves along with the push unit.

3. The port replicator as claimed in claim 2, wherein the first moving member includes a first rotating member, and the push unit includes a post abutting the first rotating member, and the push unit moves the first moving member by the post abutting the first rotating member.

4. The port replicator as claimed in claim 2, wherein the transmission assembly further comprises:
    a first spring connecting the fixed member and the first moving member so that the first moving member moves in a predetermined range.

5. The port replicator as claimed in claim 1, wherein the lift assembly further comprises:
    a link abutting the push unit at one end to rotate along with the movement of the push unit; and
    a transfer unit abutting the other end of the link end to move along with the rotation of the link and abutting the separation unit to move the separation unit.

6. The port replicator as claimed in claim 5, wherein the transfer unit comprises:
    a second moving member abutting the link and the separation unit respectively; and
    a second spring, disposed on the housing, for restraining the second moving member.

7. The port replicator as claimed in claim 1, wherein the push unit comprises:
    a first button disposed on the housing in a manner such that the first button moves between the first position and the second position; and
    a third spring, disposed on the first button, for returning the first button to the first position from the second position.

8. The port replicator as claimed in claim 7, wherein the first button includes a second rotating member abutting the lift assembly.

9. The port replicator as claimed in claim 1, wherein the separation unit comprises:
    a support fixedly disposed on the housing;
    a second button disposed in the support in a manner such that the second button moves between the third position and the fourth position; and
    a fourth spring abutting the second button to return the second button to the fourth position from the third position.

10. A port replicator comprising:
    a housing;
    a transmission assembly, disposed in the housing, including a first moving member, a fixed member and a push unit, wherein the first moving member abuts the push unit and includes an engaging portion, the fixed member is fixedly disposed on the housing for positioning the first moving member, and the push unit is disposed on the housing in a manner such that the push unit moves between a first position and a second position, and the engaging portion protrudes from the housing and is compressible when the push unit is located in the first position, and the push unit moves the first moving member so that the engaging portion moves toward the housing when the push unit moves to the second position from the first position; and
    a lift assembly, including a link, a transfer unit, and a separation unit, disposed in the housing in a manner such that the lift assembly moves along with the transmission assembly, wherein the link abuts the push unit at one end to rotate along with the movement of the push unit, and the transfer unit abuts the other end of the link to move along with the rotation of the link, and the separation unit abuts the transfer unit to move between a third position and a fourth position, and the push unit moves to the second position to move the separation unit to the fourth position from the third position via the link and the transfer unit when the push unit is located in the first position and the separation unit is located in the third position, whereby when the push unit moves to second position from the first position, the engaging portion moves into the housing before the separation unit moves.

11. The port replicator as claimed in claim 10, wherein the first moving member includes a first rotating member, and the push unit includes a post abutting the first rotating member, and the push unit moves the first moving member by the post abutting the first rotating member.

12. The port replicator as claimed in claim 10, wherein the housing includes a first through hole, and the fixed member includes a locating member that passes through the first through hole.

13. The port replicator as claimed in claim 10, wherein the transmission assembly further comprises:
  a first spring connecting the fixed member and the first moving member so that the first moving member moves in a predetermined range.

14. The port replicator as claimed in claim 10, wherein the transfer unit comprises:
  a second moving member abutting the link and the separation unit respectively; and
  a second spring, disposed on the housing, for restraining the second moving member.

15. The port replicator as claimed in claim 10, wherein the push unit comprises:
  a first button disposed on the housing in a manner such that the first button moves between the first position and the second position; and
  a third spring, disposed on the first button, for returning the first button to the first position from the second position.

16. The port replicator as claimed in claim 15, wherein the first button includes a second rotating member abutting the link.

17. The port replicator as claimed in claim 10, wherein the separation unit comprises:
  a support fixedly disposed on the housing;
  a second button disposed in the support in a manner such that the second button moves between the third position and the fourth position; and
  a fourth spring abutting the second button to return the second button to the fourth position from the third position.

18. The port replicator as claimed in claim 17, wherein the housing includes a second through hole for the second button to pass through.

19. The port replicator as claimed in claim 10, wherein the housing comprises:
  a base for the lift assembly to be disposed on; and
  a cover, combined with the base, for the transmission assembly to be disposed on.

20. The port replicator as claimed in claim 19, wherein the housing includes a receiving portion for the push unit to be disposed on.

* * * * *